United States Patent [19]
Kikkawa et al.
[11] 4,437,933
[45] Mar. 20, 1984

[54] APPARATUS FOR TREATING RADIOACTIVE LIQUID WASTES

[75] Inventors: Ryozo Kikkawa, Hitachi; Masaki Takeshima, Komae, both of Japan

[73] Assignee: Hitachi, Ltd., Tokyo, Japan

[21] Appl. No.: 398,853

[22] Filed: Jul. 16, 1982

Related U.S. Application Data

[63] Continuation of Ser. No. 238,041, Feb. 25, 1981, abandoned.

[30] Foreign Application Priority Data

Feb. 26, 1980 [JP] Japan .................................. 55-23622

[51] Int. Cl.[3] .......................... B01D 1/26; B01D 1/28; G21F 9/08; G21F 9/20

[52] U.S. Cl. ................................ 159/17 R; 159/24 A; 159/DIG. 12; 159/DIG. 16

[58] Field of Search ........... 159/DIG. 12, 17 R, 17 B, 159/22, 24 A, DIG. 16; 203/172; 352/132

[56] References Cited

U.S. PATENT DOCUMENTS

| | | | |
|---|---|---|---|
| 3,099,607 | 7/1963 | Lustenader et al. | 159/17 P |
| 3,884,767 | 5/1975 | Pottharst, Jr. | 159/17 R |
| 4,160,812 | 7/1979 | Conroy et al. | 159/17 P |

*Primary Examiner*—Bradley Garris
*Attorney, Agent, or Firm*—Antonelli, Terry & Wands

[57] ABSTRACT

Liquid wastes from atomic power plants are treated in an apparatus comprising a low electroconductivity liquid waste concentrator for evaporating a low electroconductivity liquid waste with outside steam as a heat source, and another liquid waste concentrator for evaporating another liquid waste with steam generated by evaporation of the low electroconductivity liquid waste in the low electroconductivity liquid waste concentrator as a heat source.

6 Claims, 3 Drawing Figures

APPARATUS FOR TREATING RADIOACTIVE LIQUID WASTES

This is a continuation of application Ser. No. 238,041, filed Feb. 25, 1981, now abandoned.

The present invention relates to an apparatus for treating radioactive liquid wastes, and more particularly to an apparatus for treating radioactive liquid wastes, suitable for recovery and reuse of water from radioactive liquid wastes generated in atomic power plants after reduction of their radioactivities.

Recently, atomic power plants have been increased in number, and consequently the amount of radioactive liquid wastes generated from these plants has been increased, and their treatment has been a very important problem.

A typical apparatus for treating radioactive liquid wastes now employed in atomic power plant is disclosed in Japanese Kokai (laid-open) Patent Application No. 93865/75, where liquid wastes are separated, collected, treated, and disposed according to their sources.

Among the liquid wastes from the various sources, a shower drain (waste water from showers and hand washing for operators in a controlled zone), a storm drain (usually non-radioactive and with a less possibility of radioactive pollution), an oil drain (lubicating oil drain, etc. from machinery and with a less possibility of radioactive pollution) are all very low in radioactivity, and thus are subjected to simple treatment such as mere passage through a filter or an oil adsorber, and discharged to the outside of the system. Such treatment has had no problem as it is, and thus will not be taken into consideration in the present invention. That is, the liquid waste treatment is generally directed to a low conductivity liquid waste having an electroconductivity of less than 50 μS/cm, which will be hereinafter referred to as "LCW," a high conductivity liquid waste having an electroconductivity of 50 μS/cm or higher, which will be hereinafter referred to as "HCW," and a laundry drain, which will be hereinafter referred to as "LD."

LCW, HCW and LD have been so far treated as follows:

(1) LCW treatment

LCW is a liquid waste with a high purity, for example, 10 μS/cm and a low impurity concentration (solid matters: less than a few ppm) from a nuclear reactor coolant system, and systems dealing with reactor water, condensate, and feed water, and is generated in a very large amount, so that LCW has been so far subjected to filtration and demineralization, and then the recovered water is reused. As a filter for the filtration, a filler aid-precoated filter has been so far used, but owing to use of a large amount of precoat, secondary wastes such as sludges have been produced in a large amount, and also it has been impossible to effectively remove finer solid impurities. Thus, highly effective filters with no filter aid, for example, an electromagnetic filter, a membrane filter, a centrifugal separator, etc. have been recently used in place of the precoat filter. As a waste demineralizer for the demineralization, the ordinary mixed bed type ion exchanging demineralizer has been so far used.

(2) HCW treatment

HCW is a liquid waste with a low purity, for example, 100–10,000 μS/cm, and a high impurity concentration (solid matters: about 100 ppm) such as floor drain, demineralization-regeneration liquid waste from plant water purification facility, etc., and is not suitable for demineralization treatment without removal of soluble components, and thus evaporation and successive demineralization of the resulting distillate have been so far used for water recovery and reuse (a portion of recovered water is discharged to the outside of the system). The evaporation-demineralization procedure would not be greatly changed for the time being.

(3) LD treatment

LD is a liquid waste resulting from washing of clothes used in the controlled zone, and is now discharged to the outside of the system after removal of foreign matters by a filter. However, most of the radioactivity discharged from the apparatus for treating liquid wastes is originated from LD, and thus recovery and reuse of water from LD are becoming the general trend as one of measures for reducing the radioactivity to be discharged from the apparatus for treating liquid wastes, and now reverse osmosis treatment, evaporation treatment, and treatment based on their combination are now studied.

These are the current technical procedures used for treating LCW, HCW and LD but they still have the following problems.

(a) Requirements for improved filtration technique for finer solid impurities, for example, finer piping rust particles, in LCW:

It is the general trend to provide a condensate filter in a mixed bed type ion-exchanging demineralizer, which will be hereinafter referred to as "condensate demineralizer" in the condensate system of BWR (boiling water reactor) type atomic power plants, where it is certain that the solid impurities in the backwash water from the condensate demineralizer are made finer, and also other solid impurities in LCW than those in the backwash water from the condensate demineralizer are made finer with increasing operating years of the atomic power plants. Under these situations there is an anxiety about whether or not LCW can be effectively treated by filtration. Even now, there are many atomic power plants where the backwash water from the condensate demineralizer is treated by evaporation. This fact means that the solid impurities are entrained together with the treated water into a recovered water storage tank, and a portion of the entrained solid impurities is brought into the nuclear reactor, where formation of radioactivated crads is promoted, resulting in increase in radioactive dosage in the primary machinery and pipings.

(b) Corrosion prevention of materials of construction in the apparatus for treating HCW and LD by evaporation:

The apparatus has a high possibility of being exposed to a high chloride ion concentration atmosphere due to the chloride ions from the ion exchange resin used, and thus requires measures against corrosion of materials of construction.

(c) Economic treatment of LD

Treatment based on a combination of reverse osmosis and evaporation is said to be most economical for treating LD, and measures for saving heat consumption for evaporation has been desired.

Under these situations, the present invention has been made to provide an apparatus for effectively treating radioactive liquid wastes capable of treating LCW and other liquid wastes by evaporation with good heat economy.

The present invention is characterized by an apparatus for treating radio-active liquid wastes from an atomic power plant, which comprises a concentrator for low conductivity liquid waste by evaporation using an external steam as a heat source and at least one concentrator for liquid wastes from other source by evaporation, using the steam generated by evaporation of the low conductivity liquid waste in the low conductivity liquid waste concentrator.

The present invention will be described in detail below, referring to the accompanying drawings in comparison with the procedures so far used.

Figure 1:
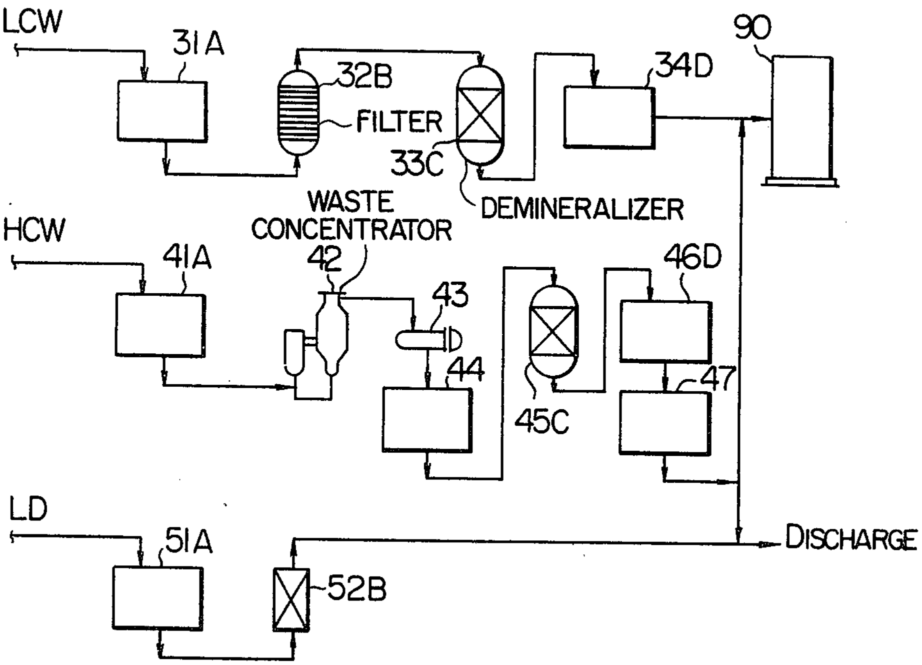
FIG. 1 is a flow diagram showing an apparatus for treating radioactive liquid wastes according to the procedure so far used.

In FIG. 1, a flow diagram of an apparatus for treating radioactive liquid wastes from an atomic power plant so far used is given, wherein liquid wastes from three sources, i.e. LCW, HCW, and LD, are individually treated to recover water for reuse.

LCW is collected into collector tank 31A, then passed through filter 32B and then through waste demineralizer 33C and stored in sample tank 34D, and then led to recovered water storage tank 90. HCW is collected into collector tank 41A and then led to waste concentrator 42, where HCW is evaporated by outside heat source, and the resulting steam is condensed in waste condenser 43 and the condensate is stored in distillate tank 44. Then, the condensate is passed through waste demineralizer 45C and stored in sample tank 46D and then in storage tank 47. The recovered water is then led to recovered water storage tank 90 or discharged to the outside of the system. LD is collected in collector tank 51A and then passed through filter 52B, and the resulting filtrate is discharged to the outside of the system.

Figure 2:
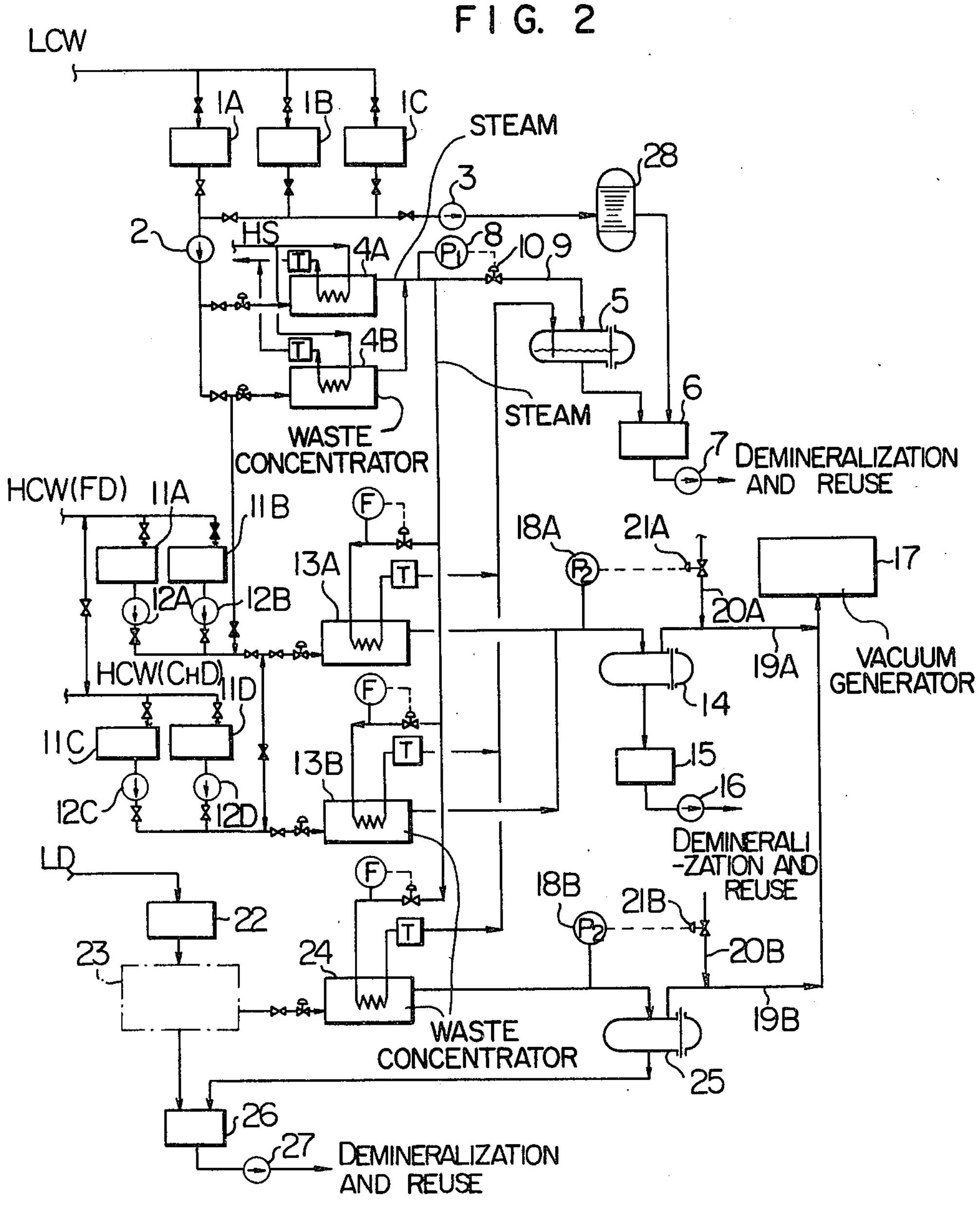
FIG. 2 is a flow diagram showing one embodiment of the apparatus for treating radioactive liquid wastes according to the present invention.

In FIG. 2, a flow diagram of one embodiment of the present apparatus for treating liquid wastes is shown, wherein LCW is collected in collector tanks 1A, 1B and 1C and then fed to an LCW concentrator 4A or 4B through a feed pump 2 for the LCW concentrator 4A or 4B in the normal operation, and heated therein with external heating steam HS, whereby LCW is evaporated. Such a necessary portion of the steam generated by evaporation of LCW is supplied to HCW and LD concentrators for evaporating HCW and LD as a heat source. And the remaining portion of the steam generated by evaporation of LCW is led to an LCW condenser 5, and cooled and condensed therein. The resulting condensate is led to a condensate tank 6 as pure water, and is passed through a demineralizer (not shown in the drawing) from the tank 6 by an LCW distillate pump 7, and recovered for reuse.

HCW is classified into floor drain, which will be hereinafter referred to as "FD," and a chemical liquid waste, which will be hereinafter referred to as "ChD," and are individually collected into collector tanks 11A or 11B, and 11C or 11D, and then led to HCW concentrators 13A and 13B, respectively, by feed pumps 12A or 12B, and 12C or 12D, where they are heated and evaporated by the steam generated by evaporation of LCW in concentrator 4A or 4B. The generated HCW steam is led to HCW condenser 14, and cooled and condensed therein, and then the resulting condensate is led to HCW distillate tank 15 as pure water, and then recovered for reuse from the tank 15 after passage through a demineralizer (not shown in the drawing) by HCW distillate pump 16.

LD is collected into collector tank 22, then concentrated to some degree in pretreating unit 23 of reverse osmosis or coagulation-precipitation type, and then led to LD concentrator 24, where it is heated and evaporated by the steam generated by evaporation of LCW in concentrator 4A or 4B. The generated LD steam is led to LD condenser 25, where it is cooled and condensed, and the resulting condensate is led to treated water tank 26 as pure water together with the treated water from the pretreating unit 23, and then recovered for reuse from the tank 26 after passage through a demineralizer (not shown in the drawing) by LD treated water pump 27.

The LCW steam used as the heat source in the HCW concentrators 13A and 13B and the LD concentrator 24 is led to LCW condenser 5, and further cooled therein, and recovered into LCW distillate tank 6 as pure water.

LCW is generated in a large amount, but the amount is fluctuated day by day. Thus, the capacities of LCW concentrators 13A and 13B must allow for evaporation of the peak amount of LCW under abnormal conditions, but this is not economical as regards apparatus cost as well as operating cost. That is, the evaporation treatment by concentrators must allow for the normal amount of LCW generated under the normal conditions. As a back-up unit for treating the peak amount of LCW generated under the so-called abnormal conditions due to, for example, leakage of sea water as a coolant from a main condenser, abnormal leakage from the machinery and startup or shutdown of a nuclear reactor, LCW filter 28 is provided, and the LCW in excess of that for the normal evaporation treatment, as appears under the abnormal conditions as mentioned above, is passed through the filter 28 by pump 3 and then recovered into the tank 6. Two LCW concentrators, for example, 4A and 4B are provided to obtain higher reliability of evaporation treatment and also to make one of them provide for HCW (FD) treatment when HCW is generated in an abnormally large amount. Thus, intercommunication is provided between the HCW concentrators 13A and 13B and between the LCW concentrator 4B and the HCW concentrator 13A by connection lines, respectively.

Treating capacity and specification of an apparatus for treating liquid wastes from a BWR type atomic power plant of 1,100 MW class according to the present invention will be as follows:

(i) LCW is generated in a normal amount of 80 $m^3$/day, with a maximum amount of 110 $m^3$/day under normal conditions and maximum about 400 $m^3$/day under abnormal conditions. Capacities of concentrators 4A and 4B are each 3 $m^3$/hour, and capacity of back-up filter 28 is 15 $m^3$/hour.

(ii) FD of HCW is generated in a normal amount of 30 $m^3$/day with a maximum amount of about 100 $m^3$/day under normal conditions, and ChD is generated with frequencies of 20–30 in a year, and amounts to 50

$m^3$ in one generation. Capacities of concentrators 13A and 13B are each 2.5 $m^3$/hour, when the back-up LCW concentrator is taken into account.

(iii) LD is generated in a normal amount of 10 $m^3$/day with maximum amount of about 30 $m^3$/day, and when LD is concentrated to 30 times the original concentration, capacity of concentrator 24 is 0.2 $m^3$/hour.

In the case of LCW filtration treatment, two LCW filters each with a capacity of 15 $m^3$/hour are required, and 3 HCW concentrators each with a capacity of 2.5 $m^3$/hour (one being for a standby) are required. Since the facility for treating LD is the same as above, the present invention based on the LCW evaporation treatment is apparatus-wise quite competitive with the LCW filtration treatment.

The present invention is characterized by using the steam generated by evaporation of LCW in the concentrators 4A and 4B as a heat source for HCW and LD evaporation treatment as described above, but, still has further features as given below in reference to the embodiment given in FIG. 2.

(a) In using the steam generated by evaporation of LCW as a heat source, the steam must be kept in a pressurized state. In the embodiment of FIG. 2, the LCW concentrators 4A and 4B are of pressurized evaporation type, where the pressure $P_1$ in the concentrators is detected by pressure gage 8 whose output signal controls pressure regulating valve 10 provided in steam line 9 to keep the steam pressure always to a constant value. When the pressure $P_1$ is too high, the thickness of the concentrators must be larger from the viewpoint of concentrator design. Furthermore, the steam temperature is increased with increasing pressure, and consequently heat transfer area of the concentrator must be increased, or the heating steam temperature of outside source must be elevated. This is not economical. Appropriate pressure for $P_1$ is about 1 kg/$cm^2$, which corresponds to a temperature of about 120° C.

(b) The HCW concentrators 13A and 13B, and the LD concentrator 24 are of vacuum evaporation type so as to suppress an increase in heat transfer area and increase a transfer heat flux density, since the steam generated by evaporation of LCW as a heat source has a relatively low temperature as described above. Pressures $P_2$ in the HCW concentrators 13A and 13B and the LD concentrator 24 are detected by pressure gages 18A and 18B, respectively, whose output signals control pressure regulating valves 21A and 21B provided in pressure control lines 20A and 20B, respectively, connected to extraction lines 19A and 19B from HCW condenser 14 and LD condenser 25 to vacuum generator 17 so as to keep the pressures $P_2$ always to a constant vacuum. Appropriate $P_2$ is about 0.203—about 0.318 kg/$cm^2$ (absolute), which corresponds to about 60°—about 70° C. in view of the precipitatibity of the liquid wastes and the realizable vacuum of the vacuum generator 17.

With the above-mentioned $P_1$ and $P_2$ values, satisfactory heat balance of steam can be obtained, as given below:

$$\begin{pmatrix}\text{Necessary}\\ \text{amount of}\\ \text{steam for}\\ \text{evaporat-}\\ \text{ing } HCW\\ \text{and } LD\end{pmatrix} = \quad (1)$$

-continued $$\frac{\begin{pmatrix}\text{Total}\\ \text{volume of}\\ HCW \text{ and}\\ LD \text{ to be}\\ \text{evaporated}\end{pmatrix} \times \left\{\begin{pmatrix}\text{Enthalpy}\\ \text{of } 65^\circ\text{ C.}\\ \text{saturated}\\ \text{steam}\end{pmatrix} - \begin{pmatrix}\text{Enthalpy}\\ \text{of } 25^\circ\text{ C.}\\ \text{water}\end{pmatrix}\right\}}{\left\{\begin{pmatrix}\text{Enthalpy of}\\ 120^\circ\text{ C. saturated}\\ \text{steam}\end{pmatrix} - \begin{pmatrix}\text{Enthalpy of}\\ 90^\circ\text{ C. water}\end{pmatrix}\right\}}$$

$$= \frac{5200[\text{kg/hr}] \times (625.36 - 20.03)\,[\text{Kcal/kg}]}{(646.31 - 90.03)\,[\text{Kcal/kg}]}$$

$$= 5659\ [\text{kg/hr}]$$

$$\begin{pmatrix}\text{Amount of}\\ \text{steam gen-}\\ \text{erated by}\\ \text{evaporation}\\ \text{of } LCW\end{pmatrix} = 6000[\text{kg/hr}] > \begin{pmatrix}\text{Necessary}\\ \text{amount of}\\ \text{steam for}\\ \text{evaporating}\\ HCW \text{ and } LD\end{pmatrix} \quad (2)$$

The following effects can be obtained according to the embodiment of the present invention given in FIG. 2.

(I) Evaporation treatment of LCW can take measures for finer solid matters in LCW and can ensure substantial removal of even finer solid matters, whereby the amount of the solid matters entrained into the primary system together with recovered water from the recovered water storage tank can be reduced.

(II) Evaporation treatment of LCW can reduce not only the concentration of solid matters, but also the radioactivity concentration of the water reused within the plant at least by one order. It is generally said that the decontamination factor of a filter (decontamination factor is a ratio of radioactivity concentration at inlet to that at outlet, and will be hereinafter referred to as "DF") is 10 for solid matters and 1 for ions; DF of a demineralizer is 10 for solid matters and 100 for ions; DF of a concentrator is 100 for solid matters and ions. Thus, suppose that a radioactivity concentration ratio of solid matters to ions in LCW be 1:1. DF of the LCW system will be 100 for the case of filtration treatment and 5000 for the present case of evaporation treatment, where the radioactivity concentration of recovered water from LCW can be reduced to 1/50 by the evaporation treatment.

The reduction of radioactivity concentration of recovered water by one order means reduction of water to be used in the plant itself and the radioactivity concentration of the water in the primary system can be also effectively reduced by one order.

(III) Since the HCW concentrators 13A and 13B and the LD concentrator 24 are operated in vacuum, they can be kept at a low temperature. This is effective for reducing the corrosion of materials of construction.

(IV) Heretofore, the conventional HCW concentrator 42 (FIG. 1) has a possibility of such troubles as radioactive contamination of house steam, etc. due to tube leakage by corrosion, whereas in the present invention the steam generated by evaporation of LCW is used in the HCW concentrators 13A and 13B and the LD concentrator 24, radioactive contamination of house steam can be prevented even if there may occur a tube leakage. In view of the quality of liquid waste to be treated in the LCW concentrators 4A and 4B, a possibility for radioactive contamination of house steam is less.

(V) Evaporation treatment of LCW can reduce a load upon the demineralizer and thus can reduce the amount of waste sludge, in other words, the number of disposal drums.

Figure 3:
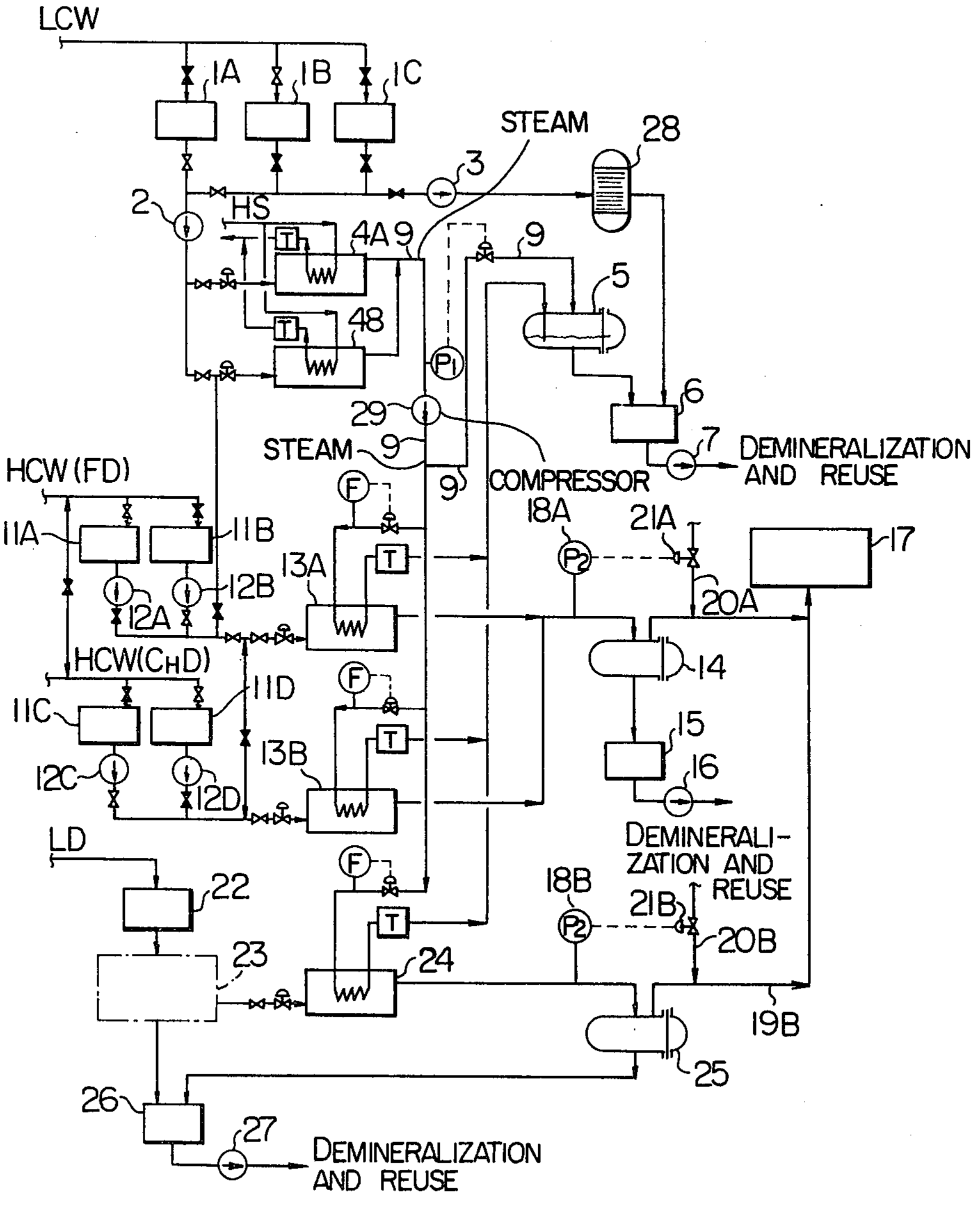
FIG. 3 is a flow diagram showing another embodiment of the apparatus according to the present invention.

In FIG. 3, a flow diagram of another embodiment of the present invention is shown, where the identical members with those of FIG. 2 are shown by the same symbols and numerals, and their explanation is omitted. In FIG. 3, the steam generated by evaporation of LCW is used as a heat source for the HCW concentrators 13A and 13B and the LD concentrator 24 as in FIG. 2, but steam compressor 29 is provided on the way of steam line 9 to increase the pressure (temperature) of the steam generated by evaporation of LCW. According to the embodiment of FIG. 3, the steam conditions for the HCW concentrators 13A and 13B and the LD concentrator 24 can be improved, and such additional effects as reduction of heat transfer area or operation under the atmosphere pressure can be obtained thereby. Besides the HCW concentrators 13A and 13B and the LD concentrator 24 that consume steam, there is another large steam-consuming unit, that is, a drier for solidifying concentrated liquid wastes and waste sludge, though not shown in the drawings, and such a drier requires steam of about 170° C. (about 7 kg/cm$^2$ in pressure) for satisfactory drying. The steam from the steam compressor 29 can meet such drier steam requirements and can be consumed in the drier. Furthermore, the steam compressor 29 can make suction of the steam generated by evaporation of LCW in the LCW concentrators 4A and 4B, which are to be exposed to negative pressure. That is, the LCW concentrators 4A and 4B can be operated under a negative pressure, that is, at a lower temperature, whereby corrosion prevention of materials of construction and reduction of heat transfer area due to an increased heat transfer flux density can be attained.

As described in the foregoing, a low conductivity liquid waste and other liquid wastes can be treated by evaporation with good heat economy and a load upon the demineralizer can be effectively reduced at the same time according to the present invention.

In the foregoing description explanation has been made particularly of liquid wastes from BRW type atomic power plants based on light water nuclear reactor, but the present invention can be also applied to those based on other type of nuclear reactors, for example, heavy water nuclear reactor.

What is claimed is:

1. An apparatus for treating radioactive liquid waste from atomic power plant, which comprises:

a low electroconductivity liquid waste concentrator of the pressurized evaporation type, for evaporating a low electroconductivity liquid waste with outside steam as a heat source at high temperature, a high electroconductivity liquid waste concentrator of the vacuum evaporation type, for evaporating a high electroconductivity liquid waste with the steam generated by evaporation of the low electroconductivity liquid waste, a laundry liquid waste concentrator of the vacuum evaporation type for evaporating a laundry liquid waste with steam generated by evaporation of the low electroconductivity liquid waste, means for supplying steam generated by evaporation in said low electroconductivity liquid waste concentrator to said high electroconductivity liquid waste concentrator as a heat source for low electroconductivity liquid waste concentration, means for supplying steam generated by evaporation in said low electroconductivity liquid waste concentrator to said laundry liquid waste concentrator as a heat source for laundry liquid waste concentration, a low electroconductivity liquid waste condenser for condensing the steam from said low electroconductivity liquid waste concentrator, said high electroconductivity liquid waste concentrator and said laundry liquid waste concentrator, a high electroconductivity liquid waste condenser for condensing the steam from said high electroconductivity liquid waste concentrator, a laundry liquid waste condenser for condensing the steam from said laundry liquid waste concentrator, and means for demineralization of condensed low electroconductivity liquid waste, high electroconductivity liquid waste and laundry liquid waste.

2. The apparatus according to claim 1, wherein the steam generated by evaporation of the low electroconductivity liquid waste in said low electroconductivity liquid waste concentrator is subjected to increase in pressure and temperature in a compressor, and fed to said high electroconductivity liquid waste concentrator and said laundry liquid waste concentrator.

3. The apparatus according to claim 1 or claim 2, wherein said low electroconductivity liquid waste concentrator is kept at an inside pressure of about 1 kg/cm$^2$ at a temperature of about 120° C.

4. The apparatus according to claim 1 or claim 2, wherein said high electroconductivity liquid waste concentrator and said laundry liquid waste concentrator are kept at an inside pressure of about 0.203—about 0.318 kg/cm$^2$ absolute and an inside temperature of about 60° C.—about 70° C.

5. The apparatus according to claim 1, further comprising a low electroconductivity liquid filter operatively connected via valve means to a feed conduit supplying low electroconductivity liquid waste to said low electroconductivity liquid waste concentrator for treating of low electroconductivity liquid waste in excess of that to be concentrated in said concentrator during abnormal operating conditions and during start-up and shut-down of the atomic power plant.

6. The apparatus according to claim 1, further comprising another low electroconductivity liquid waste concentrator of the pressurized evaporation type connected in parallel with said low electroconductivity liquid waste concentrator for evaporating the low electroconductivity liquid waste with outside steam and conduit means, including valve means, interconnecting said another low electroconductivity liquid waste concentrator to said high electroconductivity liquid waste concentrator of the vacuum evaporation type for treatment of high electroconductivity liquid waste when the amount of high electroconductivity liquid waste is abnormally large.

* * * * *